United States Patent Office 2,869,391
Patented Jan. 20, 1959

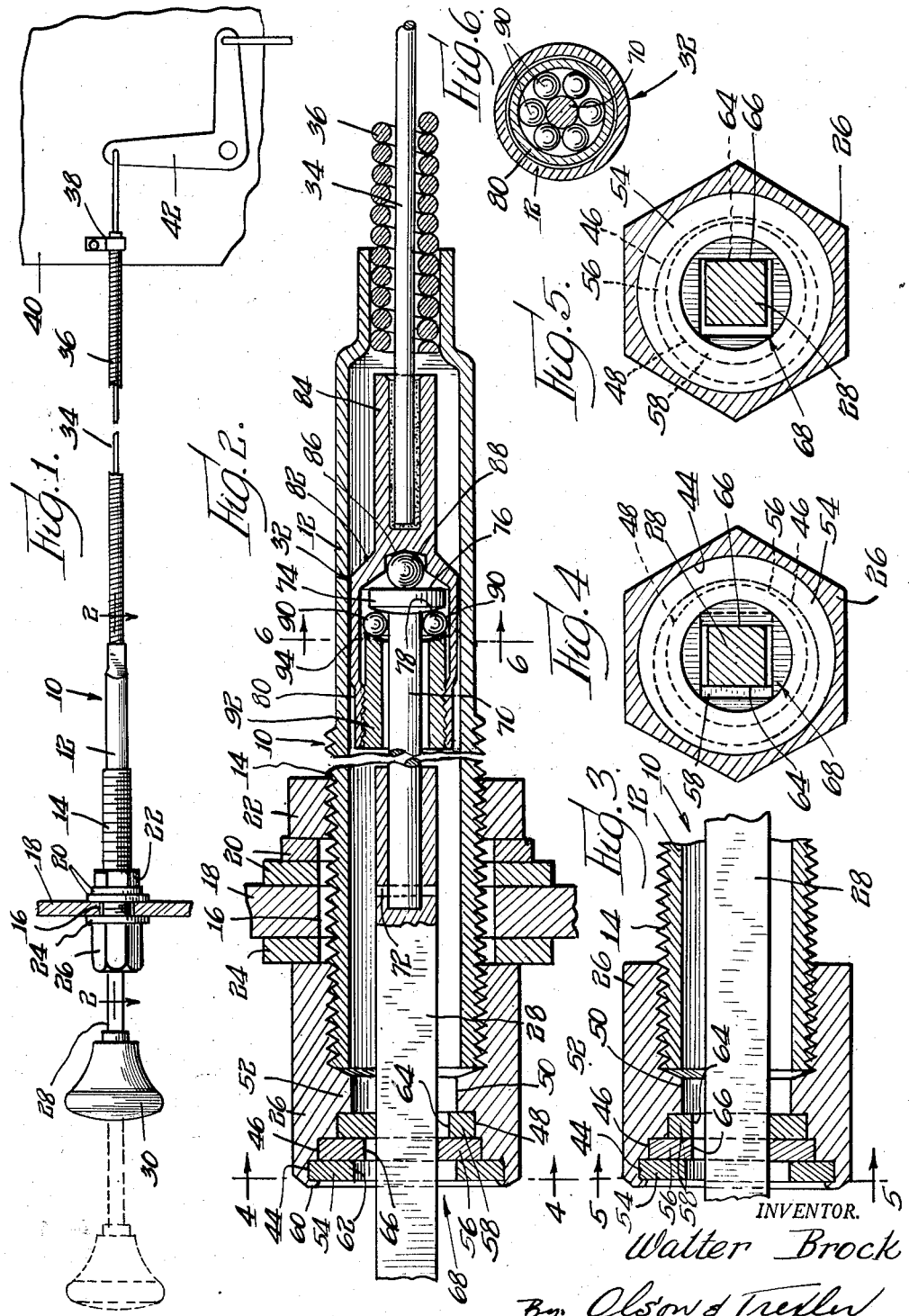

2,869,391

ROTARY LOCKING CONTROL

Walter Brock, Chicago, Ill., assignor to Arens Controls, Inc., Evanston, Ill., a corporation of Illinois Application July 2, 1954, Serial No. 440,987

9 Claims. (Cl. 74—503)

This invention is concerned generally with control mechanisms, and more particularly with control mechanisms of the manually actuated type adapted for push-pull movements, and adapted to be locked in various positions of longitudinal adjustment by means of a predetermined rotational movement of the manual control element such as a knob or handle.

It is an object of this invention to provide a rotary locking, push-pull control providing a more positive lock when in locked position than any heretofore known in the art.

Another object of this invention is to provide a rotary locking, push-pull control having a smoother lock, i. e. a lock which moves into locked position and away from locked position with a smoother and more reliable action than heretofore known.

A further object of this invention is to provide a rotary locking, push-pull control which will not vibrate loose when used with a mechanism subject to intense vibrations such as in aircraft and the like.

In rotary locking, push-pull controls it generally is undesirable to have the inner or control member rotate. Such rotation would not only place undesirable stress on the control member, but the reaction would set up a torsional force tending to unlock the lock.

Accordingly, it is an object of t his invention to provide a swivel in a rotary locking push-pull control interconnecting the rotary locking elements and the control member with a minimum of friction, providing substantially a ball bearing connection.

A further object of this invention is to provide a rotary locking, push-pull control having an improved swivel connection between the rotary locking member and the control member substantially eliminating backlash.

Other and further objects and advantages of the present invention will be apparent from the following description when taken in connection with the accompanying drawings wherein:

Fig. 1 is a side view of a rotary locking, push-pull control constructed in accordance with the principles of this invention;

Fig. 2 is a fragmentary longitudinal sectional view through the control taken substantially along the line 2—2 of Fig. 1;

Fig. 3 is a view similar to a portion of Fig. 2 showing the parts in a different position of adjustment;

Fig. 4 is an end view partially in section taken along the line 4—4 of Fig. 2 showing the lock in locked position;

Fig. 5 is a similar view with the lock in unlocked position and taken along the line 5—5 of Fig. 3; and Fig. 6 is a sectional view along the line 6—6 of Fig. 2 showing the ball bearing swivel construction.

Referring first to Figs. 1 and 2, there will be seen a rotary locking, push-pull control generally designated by the numeral 10. The control includes a frame sleeve 12 having a threaded portion 14 projecting through an aperture 16 in a panel 18. Washers 20 encircle the threaded portion 14 of the frame sleeve and are jammed against the inside of the panel by a nut 22. A lock washer 24 is held against the front of the panel 18 by a sleeve nut 26 of special construction shortly to be described.

An operating sleeve 28 preferably of square cross section is mounted in the frame sleeve 12 and nut 26 for longitudinal and rotational movement. A handle or knob 30 is suitably affixed to the outer end of the operating sleeve 28. The operating sleeve is connected by a swivel 32 of a construction which likewise will be discussed shortly to an elongated, flexible wire or operating member 34. The operating member is longitudinally movable in a flexible sheath 36 which may comprise a spirally wound wire spring. The end of the sheath 36 is anchored as at 38 on a fixed part 40 which carries, or is fixed relative to a controlled member or mechanism such as the bell crank 42.

The sleeve nut 26 is provided with a counterbore, or more accurately with three counterbores 44, 46, and 48 of progressively smaller diameter. All of the counterbores are circular in cross section, but they are not all concentric, nor are they all concentric with the bore or opening 50 in a seating flange 52 in the sleeve nut, said flange forming a seat for the frame sleeve 12, and also for a series of washers hereinafter to be set forth.

Three washers 54, 56, and 58 are respectively rotatably received in the counterbores 44, 46, and 48 and are respectively of substantially the same diameters as the counterbores in which they are received.

The outer washer 54 is held in place by peening over the rim of the sleeve nut as at 60, and the washer 54 serves as a holding washer to hold the washers 56 and 58 in their proper positions. The aperture 62 in the washer 54 conveniently is circular and is much larger than the operating sleeve 28 so as to provide clearance therefor.

The innermost and smallest diameter washer is provided with a central aperture 64 which is complementary to, but slightly larger than, the operating sleeve 28 which, as noted, preferably is square. The circumference of the washer 58 and the square opening 64 are relatively slightly eccentric. The counterbore 48 in which the washer 58 is rotatable is concentric relative to the bore 50 and to the main structure of the sleeve nut 26.

The next larger washer 56 also is provided with a square aperture 66, this aperture being concentric with the periphery of the washer 56. However, the counterbore 46 in which this washer is rotatable is eccentric relative to the bore 50 and the main portion of the sleeve nut 26.

The degrees of eccentricity of the counterbore 46 and of the opening 64 in the washer 58 are such that in one position of rotation the washer holes 64 and 66 will be aligned. This condition is shown in Figs. 3 and 5. Since the washer holes 64 and 66 are somewhat larger than the cross section of the o erating sleeve 28, the operating sleeve is free for longitudinal adjustment or movement through the sleeve nut including the washers and through the frame sleeve. When the handle 30 is rotated in either direction to rotate the operating sleeve in a corresponding direction, the operating sleeve rotates the washers 56 and 58 due to the square cross section of the operating sleeve and the square openings in the washers. It will be appreciated that other non-circular shapes could be used, and that a circular operating sleeve and circular washer holes could be used if the washers were suitably keyed to the operating sleeve. Such rotation of the washers 56 and 58 causes the apertures 66 and 64 to become misaligned due to the eccentricity of the counterbore 46 and the relative eccentricity of the washer hole 64 and the periphery of the washer 58. This causes the edges of the washer holes to clamp against opposite sides of the operating sleeve 28 as shown in Figs. 2 and 5.

This frictionally locks the operating sleeve 28 against longitudinal movement in either direction. The handle and operating sleeve turn very easily into locking position, and the lock may be partially applied for frictionally controlled longitudinal movement of the operating sleeve, or the lock may be fully applied to hold the operating sleeve firmly in adjusted position. It will be appreciated that the handle can be turned in either direction to lock, and that it would be turned in the opposite direction to unlock it.

As heretofore noted, it is undesirable to place any torsional force on the operating member 34 as this would result in a reactive force tending to unlock the lock comprising the operating sleeve 28, and the washers 56 and 58 along with their accompanying counterbores, and hereinafter generally identified by the numeral 68. Accordingly, the operating sleeve 28 is connected to the operating member 34 by means of the swivel 32. The swivel includes a longitudinal stem 70 (Fig. 2) having its outer end received in a complementary bore in the operating sleeve 28 and suitably fixed therein by means such as a press fit or cross pin 72. The stem 70 is provided with a head 74 having a flat upper or outer surface 76. The under surface of the head comprises a spherical section 78.

The swivel 32 further includes a cylindrical body 80 terminating in a frusto-conical portion 82. This latter portion is provided with a longitudinally extending swivel sleeve 84 receiving the end of the operating member 34 which may be secured by means such as a press fit or a weld.

The frusto-conical portion 82 of the swivel is provided with a ball seat 86 having cylindrical and frustoconical portions, and a rather large hardened steel ball 88 is mounted in this seat with the flat 76 of the head 74 bearing against it. A plurality of smaller balls 90 (Figs. 2 and 6) encircles the stem 70 and fits snugly between the stem and the cylindrical portion 80 of the swivel. A sleeve 92 may be press fitted but preferably is threaded in the cylinder 80 and is provided with surfaces 94 which may be beveled, or preferably are cylindrical sections. These surfaces bear against the balls 90 and hold these balls snugly against the spherical surface 78 of the head 74.

Thus, the balls 88 and 90 position the head 74 so that it contacts nothing but the balls, and the operating sleeve 28 therefore has a ball bearing connection with the operating member 34. The provision of the single ball 88 in engagement with the flat face 76, and the ring of balls 90 in engagement with the spherical section face 78 allows not only a rotary ball bearing movement, but also a slight tipping movement, it being noted that a slight clearance is provided adjacent the balls 90. Thus, the operating sleeve 28 may pivot slightly about the ball 88 for proper engagement with the locking washers 56 and 58.

From the foregoing description it will be apparent that the rotary locking, push-pull control herein disclosed is relatively simple and economical to fabricate, particularly with regard to the lock thereof. The lock is quite positive when in locked position, the lock operates more smoothly than any heretofore known in the art, and the lock will not vibrate loose when used with a mechanism subject to intense vibrations such as in aircraft and the like. The improved swivel eliminates torsional forces tending to unlock the lock, it is smooth and accurate in operation, and it substantially eliminates backlash.

It has been noted heretofore that the particular shape of the operating sleeve and of the apertures in the washers need not necessarily be square as disclosed. The essential feature is that the washers be relatively rotatable to their seats, and this is most conveniently done by fixing them for rotation with the operating sleeve.

It will be appreciated that the specific example of the invention herein shown and described is for illustrative purposes only. Structural modifications will no doubt occur to those skilled in the art, and will be understood as forming a part of this invention insofar as they fall within the spirit and scope of the appended claims.

I claim:

1. A control mechanism comprising frame means, an operating member of non-circular cross-section longitudinally reciprocable with respect to said frame means and adapted to be connected to a device to be controlled, control means operably connected to said operating member for effecting its actuation and locking means carried from said frame means for locking engagement with said operating member, said locking means including a pair of adjustably mounted apertured members having non-circular apertures receiving said operating member and in one position of adjustment being sufficiently aligned to allow substantially unrestricted longitudinal movement of said operating member, and means for relatively eccentrically rotating said apertured members to effect misalignment of said apertured members to effect substantially balanced gripping of said operating member on opposite sides thereof by said locking members.

2. A control mechanism comprising frame means, an operating member longitudinally reciprocable with respect to said frame means and adapted to be connected to a device to be controlled, control means operably connected to said operating member for effecting its actuation and locking means carried from said frame means for locking engagement with said operating member, said locking means including a pair of relatively eccentric journals of circular outline, a pair of locking members having circular outlines and mounted in said journals, said locking members having apertures therethrough, one of said apertures being eccentric relative to the periphery of the member which it is in, said apertures in one position of rotation of said members being sufficiently aligned to allow substantially free longitudinal movement of said operating member through said apertures, and means for rotating said members to effect misalignment of said apertured locking members to cause substantially balanced gripping of said operating member on opposite sides thereof by said locking members.

3. A control mechanism as set forth in claim 2 wherein the locking members comprise washers.

4. A control mechanism as set forth in claim 2 wherein the journal in which the member having the eccentric aperture rotates is concentric with the frame means, the other locking member has an aperture concentric with its periphery, and the journal in which said other locking member rotates is eccentric relative to said frame means.

5. A control mechanism comprising frame means, a longitudinally uniform operating member of polygonal cross section having straight edges and being longitudinally reciprocable with respect to said frame means and adapted to be connected to a device to be controlled, a control means operably connected to said operating member for effecting its actuation and locking means carried from said frame means for locking engagement with said operating member, said locking means comprising a pair of adjustably mounted apertured members, said apertures being of similar polygonal configuration to said operating member and having corresponding straight edges, said operating member extending through the apertures in said locking members and being rotationally locked relative thereto, said apertures in one position of adjustment of said locking means being sufficiently aligned to allow substantially unrestricted longitudinal movement of said operating member, and means effective upon rotation of said operating member and consequent rotation of said locking members to cause misalignment of said apertured locking members to effect substantially balanced gripping of said operating member on opposite sides thereof by said locking members with corresponding straight edges in engagement.

6. A control mechanism as set forth in claim 5 wherein the locking members have circular outlines and the aperture in one of said locking members is eccentric relative to said one of said locking members, and the means for causing misalignment of said locking members comprises relatively eccentric journals in which said locking members are rotatably journaled.

7. A control mechanism as set forth in claim 6 wherein the journal in which the locking member having the eccentric aperture rotates is concentric relative to the frame means, the aperture in the other locking member is concentric with the periphery thereof, and the journal rotatably mounting said other locking member is eccentric relative to said frame means.

8. A control mechanism comprising frame means, a longitudinally uniform two-piece operating member of non-circular cross-section longitudinally reciprocable with respect to said frame means and adapted to be connected to a device to be controlled, a rotary coupling connecting the two pieces of said operating member for allowing relative rotation of said two pieces while effecting simultaneous longitudinal movement, control means operably connected to one piece of said control member for effecting its actuation, and locking means carried from said frame means for locking engagement with said operating member, said locking means including a pair of adjustably mounted locking members having apertures through which said one piece of said operating member passes, said apertures in one position of adjustment of said locking members being sufficiently aligned to allow substantially free longitudinal movement of said operating member, means coupling said locking members to said one piece of said operating member for rotation therewith, and means effective upon rotation of said one piece of said operating member and of said locking members to cause misalignment of said apertures to effect substantially balanced gripping of said one piece of said operating member on opposite sides thereof by said locking members.

9. A control mechanism comprising frame means, a longitudinally uniform two-piece operating member of noncircular cross section longitudinally reciprocable with respect to said frame means and adapted to be connected to a device to be controlled, a rotary coupling connecting the two pieces of said operating member for allowing relative rotation of said two pieces while effecting simultaneous longitudinal movement, control means operably connected to one piece of said control member for effecting its actuation, locking means carried from said frame means for locking engagement with said operating member, said locking means including a pair of adjustably mounted locking members having apertures through which said one piece of said operating member passes, said apertures in one position of adjustment of said locking members being sufficiently aligned to allow substantially free longitudinal movement of said operating member, means coupling said locking members to said one piece of said operating member for rotation therewith, means effective upon rotation of said one piece of said operating member and of said locking members to cause misalignment of said apertures to effect gripping of said one piece of said operating member by said locking members, said rotary coupling means including a male coupling member and a female coupling member, a single ball mounted between said male and female coupling members for absorbing compressive thrusts, and a plurality of balls mounted within said female coupling member and behind a part of said male coupling member for absorbing tension.

References Cited in the file of this patent

UNITED STATES PATENTS

| 921,216 | Fisher | May 11, 1909 |
| 1,526,248 | Small | Feb. 10, 1925 |
| 1,698,803 | Petersen | Jan. 15, 1929 |
| 1,763,927 | Ireland | June 12, 1930 |
| 2,448,968 | Franck | Sept. 7, 1948 |
| 2,502,780 | Dreffein | Apr. 4, 1950 |
| 2,676,610 | Hare | Apr. 27, 1954 |